Nov. 18, 1958     W. H. TAYLOR     2,860,490
METHOD AND APPARATUS FOR PRODUCTION OF SUPER-COOLED ICE
Filed July 25, 1952     3 Sheets-Sheet 1
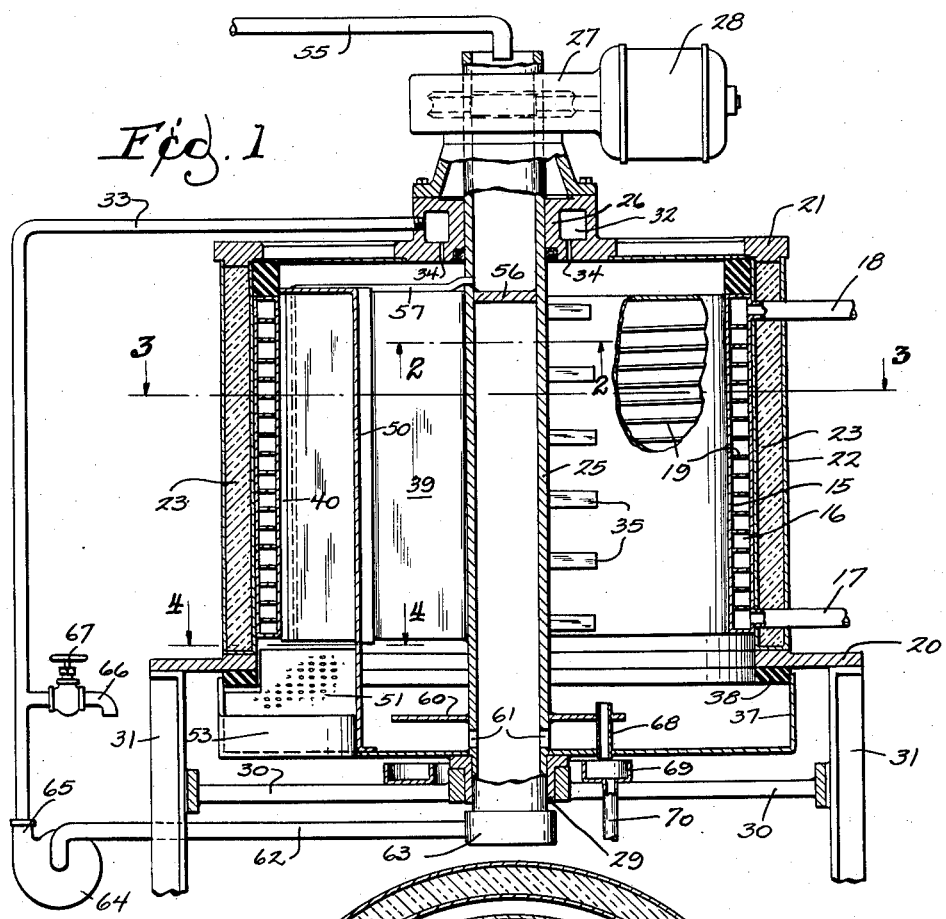
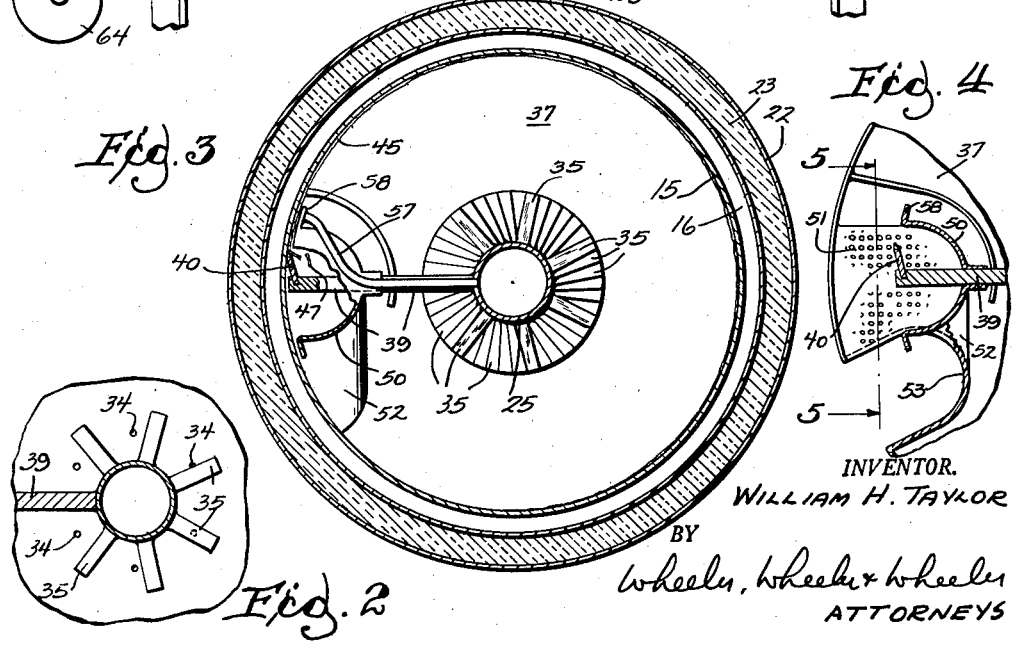
INVENTOR.
WILLIAM H. TAYLOR
BY
Wheely, Wheeler & Wheeler
ATTORNEYS

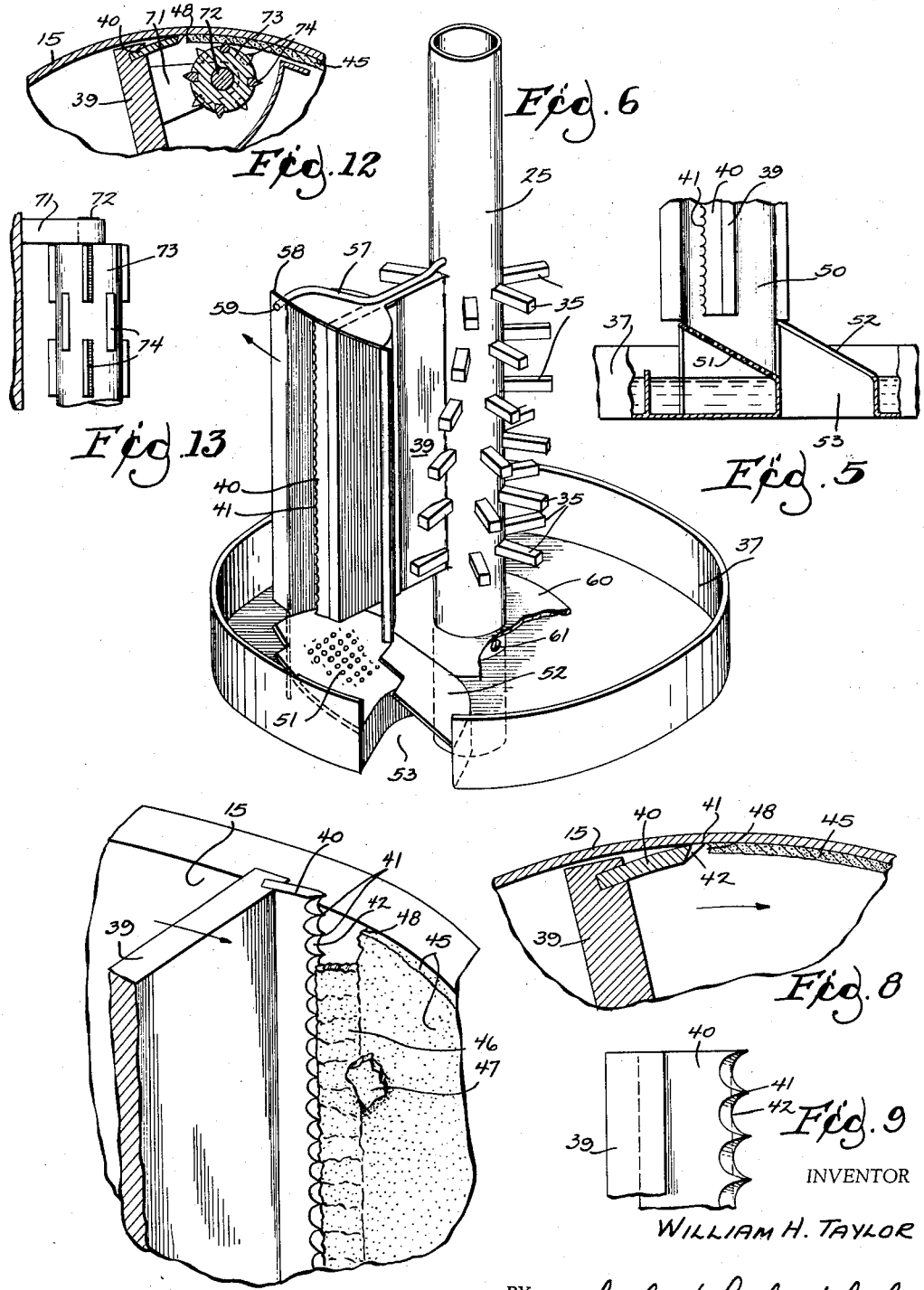

Nov. 18, 1958        W. H. TAYLOR        2,860,490
METHOD AND APPARATUS FOR PRODUCTION OF SUPER-COOLED ICE
Filed July 25, 1952                3 Sheets-Sheet 3
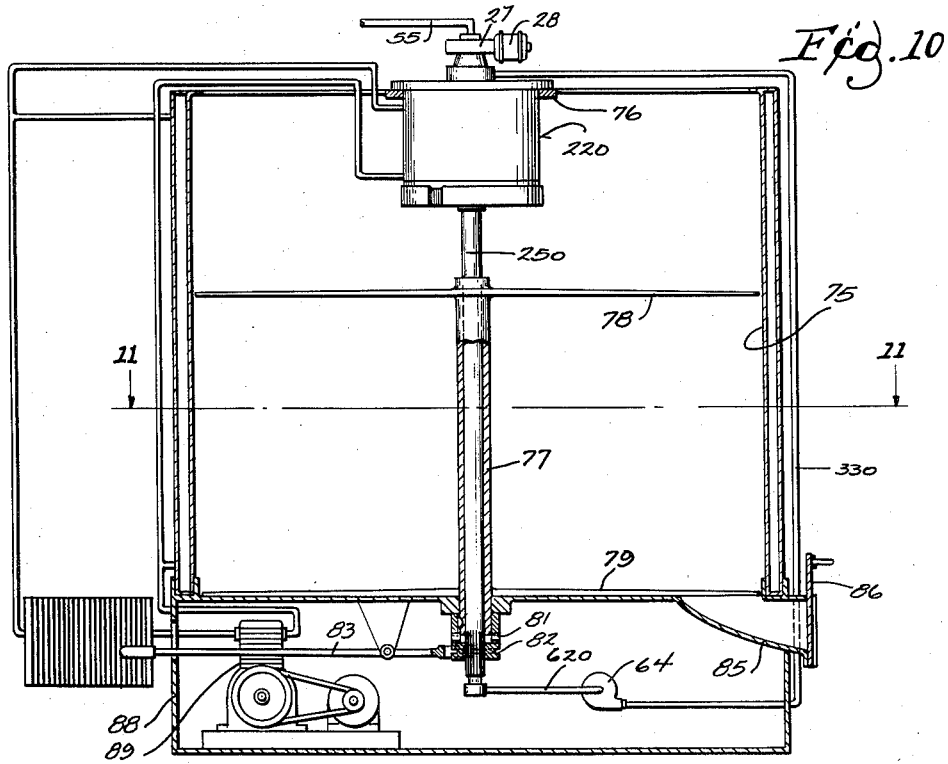
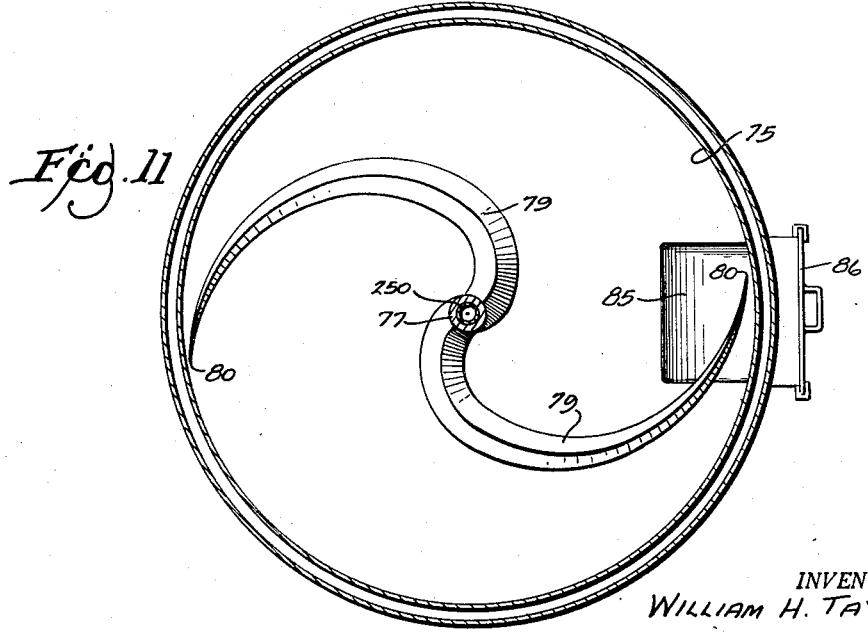
INVENTOR.
WILLIAM H. TAYLOR
BY
Wheeler, Wheeler & Wheeler
ATTORNEYS United States Patent Office 2,860,490
Patented Nov. 18, 1958

2,860,490

METHOD AND APPARATUS FOR PRODUCTION OF SUPER-COOLED ICE

William H. Taylor, Chicago, Ill., assignor to The Vilter Manufacturing Company, Milwaukee, Wis.

Application July 25, 1952, Serial No. 300,915

27 Claims. (Cl. 62—71)

This invention relates to a method and apparatus for production of super-cooled ice.

The liquid to be frozen is sprayed at a temperature close to its freezing point upon the interior of a cylindrical surface which is maintained at a temperature very much below such freezing point. From this surface, the ice is mechanically dislodged, not in the form of scrapings, but in the form of chips substantially equal in thickness to the entire deposit on the wall. This is accomplished by a rotatable blade having plowlike points, the blade operating within a shroud which protects from the spray the super-cooled ice which is being dislodged by the blade. Meantime, the ice is being washed of concentrated impurities of which the liquid has freed itself in the course of the freezing operation. The liquid used for washing the super-cooled ice is reduced to a temperature close to its freezing point and is commingled with other water in the sump. A small portion of the mixture is being continuously discharged from the sump to eliminate impurities and the remaining large portion is constantly recirculated to create the spray.

The ice dislodged from the surface upon which it is frozen falls through the aforesaid shroud to a screen through which the dust passes to the sump, the ice chips being diverted into a storage hopper wherein, because of their superchill, they will remain free of mutual adhesion for instant discharge when needed.

In creating the spray which freezes on the cylindrical surface, I have found it important to clarity of the ice, as well as cleanliness, and important also to reduction in overhead, to discharge the liquid at extremely high velocity through openings which are sufficiently large to be non-clogging. In the path of the resulting streams of high velocity liquid, a series of staggered baffles slowly rotate and the liquid streams, encountering such baffles, are broken up into a very fine spray of liquid particles which have a velocity in the general range of one thousand feet per minute. This gives as much spray as might be produced by thousands of conventional nozzles and it avoids the clogging problems to which atomizing nozzles would be subject. Moreover, it produces crystal clear ice, despite the rapid rate of freezing. In general, the faster a liquid is frozen, the more milky will be the ice. The milky appearance can be avoided only if the aqueous liquid being frozen is agitated at a sufficiently high rate. The high velocity of the sprayed liquid particles, and the minute size thereof, result in instant freezing during contact of the particles with the chamber wall at an impact sufficient to produce the requisite agitation to enable the freezing to take place with no milkiness whatever.

In the accompanying drawings:

Fig. 1 is a view in axial section through an ice chip manufacturing device embodying my invention.

Fig. 2 is a fragmentary detail view taken in section on the line 2—2 of Fig. 1.

Fig. 3 is a view taken in section on the line 3—3 of Fig. 1.

Fig. 4 is a somewhat enlarged fragmentary detail view taken in section on line 4—4 of Fig. 1.

Fig. 5 is a view taken in section on the line 5—5 of Fig. 4.

Fig. 6 is a view in perspective showing the rotor and base of the apparatus of Fig. 1 with the freezing chamber wall removed.

Fig. 7 is an enlarged fragmentary detail view in perspective showing the ice dislodging plow blade in operation.

Fig. 8 is a view taken in horizontal section through the parts shown in Fig. 7.

Fig. 9 is a detail view in front elevation of the plow blade.

Fig. 10 is a view in axial section through the storage bin which receives the ice discharged from the device shown in Fig. 1, the freezer being shown in side elevation within the bin.

Fig. 11 is a view taken in section on the line 11—11 of Fig. 10.

Figures 12 and 13 illustrate details of a toothed roller.

It will be understood that a freezer embodying my invention may be used as a separate entity, as portrayed in Figs. 1 to 9, or it may be housed within the storage bin as suggested in Fig. 10, in which case the agitator shaft of the bin and that of the freezer may be aligned and driven from a common source.

The freezer comprises a wall 15 of circular cross section, the wall being desirably cylindrical as shown and having a jacket 16 into which refrigerant is supplied from pipe 17 and from which the refrigerant is withdrawn through pipe 18. A helical partition at 19 may be used to guide the refrigerant through the jacket to be sure that it will contact all surfaces of the wall 15.

The wall 15 is mounted on an annular base at 20 and provided with an annular head 21. An outer sleeve at 22, confined between the base and head, confines insulation at 23.

Coaxial with the refrigerated wall 15 is a tubular pipe 25 provided at 26 with a bearing in the head. Mounted on the head is a gear case at 27 supporting a motor 28 having a worm and worm gear driving connection to the tubular shaft 25. I have found a shaft speed of 1 R. P. M. to be appropriate, but this is stated merely by way of example, as the speed does not appear to be critical. The lower end of the shaft is provided with a bearing at 29 carried by arms 30 from the supporting frame 31 upon which the base 20 is mounted.

Surrounding the upper shaft bearing 26 is an annular chamber 32 into which leads pipe 33 for supplying liquid under relatively high pressure. This liquid is discharged from the annular chamber 32 through a number of holes 34 extending axially through the center hub of head 21. In practice, I have successfully employed six such holes of 3/16 inch diameter. The diameter should be large enough so that there will be little or no tendency for the holes to become clogged. In the path of the streams of liquid issuing from the holes 34 are baffle pegs 35 arranged helically on shaft 25 and projecting substantially radially therefrom. By way of example, forty-two such pegs are used at six different levels, there being seven pegs at each level and the pegs of one level being progressively offset circumferentially of the shaft from the pegs of the preceding level. Liquid streams issuing from the holes 34 will necessarily encounter one or more baffle pegs, the high velocity breaking up the streams of liquid into atomized particles which will fill the chamber within the wall and be projected toward, and will strike, the wall with very high impact velocity. I prefer that the pegs have upper surfaces at least approximately flat and also desirably approximately horizontal to get spray distribution which is as nearly as possible uniform and free of "pattern." The amount of spray thus forcibly projected against the wall, and against ice previously frozen thereon, will be as great as could be delivered by hundreds or perhaps thousands of nozzles capable of atomizing the liquid to equal fineness. Nozzles capable of fine atomization will clog, whereas the apparatus shown is substantially free of this difficulty.

The refrigerant supplied to the jacket 16 of wall 15 is desirably super-cooled very substantially below the freezing point of the liquid thus sprayed upon the wall. In consequence, and because the liquid atomized is already close to its freezing point, such particles as strike the wall, or ice previously deposited, are instantaneously frozen. With the incoming liquid close to its freezing point, and the wall chilled to a temperature of 0° to 5° F., I find that the ice is already super-cooled to 16° F. before being contacted by the blade. The figures given are, of course, merely by way of example. By reason of their high impact velocity at the time of freezing, each successive particle freezes into clear ice rather than milky ice. Particles of liquid which do not freeze fall into the collecting pan 37 which is mounted on the lower end of the tubular shaft 25 to rotate therewith. The upper rim of the pan engages an annular rubber seal at 38 to provide a closed connection between the pan and the freezing chamber within wall 15.

Extending nearly the full height of such freezing chamber, and connected with tubular shaft 25 to project radially therefrom, is an arm 39 which carries at its outer free end a plow blade 40 of relatively thin, high grade tool steel which is slightly yieldable resiliently. Details of this blade are shown in Figs. 7, 8 and 9. Its general extent is axial, but the blade teeth 41 project circumferentially of the inner surface of the wall 15. The inner surface of wall 15 is desirably highly polished and may be plated with nickel or the like. The mating rear face of blade 40 is ground to fit and desirably finished with polished chrome to avoid scoring or roughening wall 15. The blade is desirably confined under radial pressure so that its resilient bias holds its teeth firmly against wall 15. The outer face of the blade preferably bears directly against the wall, and the plow teeth 41 are formed by channels at 42 cut into the inner face of the leading edge of the blade. The ice deposit built up on the inner face of the wall is shown at 45 in Figs. 7 and 8. The plow-like teeth 41 do not scrape the surface of this deposit but force their way between the deposit and the wall to cause strips of ice to break away from the deposit 45 as shown at 46 in Fig. 7. These strips tend, in turn, to break up into chips 47, each of which is equal in thickness to the entire deposit acted upon by the blade and equal in length to the spacing between successive teeth 41.

The fact that these chunks or chips of ice are bodily dislodged, results in leaving at the point of fracture a well defined shoulder 48, as shown in Figs. 7 and 8, making it more readily possible for the plow points 41 of the blade 40 to pass behind the deposit 45, instead of merely riding upon, or scraping across, the surface of such deposit.

The ice dislodged falls downwardly within the confines of a hood 50 carried by the arm 39 which supports the plow blade 40. This hood not only protects from the spray the ice immediately ahead of the plow blade and the surface of wall 15 immediately behind the plow blade, but it keeps the chips discrete by preventing the spray from freezing the chips together. The hood also guides the dislodged ice chips 47 downwardly onto a foraminous baffle 51, the perforations in which pass any fine particles into the pan or receptacle 37. The ice chips of substantial size are guided outwardly beneath the cover plate 52 to fall through the notch or delivery port 53 with which the pan 37 is provided, as best shown in Figs. 4, 5 and 6. The ice may either be collected for immediate use or it may be stored in a bin as hereinafter disclosed.

As is well known, a freezing operation is also a concentrating operation. The water tends to freeze free of its impurities and dissolved salts and other materials. To wash the ice deposited on wall 15, and thereby to remove from the surface of the ice all impurities and other dissolved matter, I constantly flow across the deposited ice layer 45, within hood 50 and immediately in advance of the plow blade, a stream of liquid which is thereafter collected in pan 37. The liquid used is supplied through the make up pipe 55 and enters the top of tubular shaft 25, as shown in Fig. 1. In practice, I use a sufficient amount of make up water to overflow from the pan about 20% as much water as is returned from the pan to the streams delivered against the pegs for atomization. The particular percentage of discharge is a matter of choice and depends upon the amount of impurities or salts or foreign matter in the water.

A partition 56 at about the level of the upper end of the refrigerated wall 15 diverts the liquid into a duct or pipe 57 leading outwardly from the tubular shaft 25 and through a forwardly projecting flange 58 of hood 50. Its discharge orifice 59 is best shown in Fig. 6. Confined between flange 58 and the ice deposit 45, the wash liquid flows downwardly through the advancing hood, washing impurities and salt and other foreign matter from the ice. The wash liquid and whatever impurities it re-dissolves flows through the foraminous baffle 51 into the collecting pan 37. Since the make up liquid is ordinarily supplied at a temperature considerably above the freezing point, and since the liquid taken from pan 37 is used for the spray above described and must be lowered to or near its freezing point, no energy is lost in thus washing the surface of the deposited ice.

A baffle disk 60 is carried near the lower end of tubular shaft 25 at an intermediate level within the collecting pan 37, below the normal level of liquid therein. From beneath this baffle open the ports 61 through which liquid flows from the collecting pan 37 to a pipe 62 having a swivel cup connection at 63 with the lower end of tubular shaft 25. Pipe 62 leads to the inlet of pump 64, the discharge coupling 65 of which connects with pipe 33 above mentioned. The pump 64 comprises the means for delivering the liquid to be frozen under high pressure and at a temperature close to its freezing point to the annular chamber 32 from which such liquid is delivered in streams for atomization as above described.

The outlet from pump 64 may be tapped through faucet 66 controlled by valve 65 for the discharge of any desired proportion of the liquid. Since a substantial amount of the atomized liquid returns to the collecting pan 37, and is re-circulated, the continuous discharge of a portion of such liquid may be used to maintain the impurities or salts therein below any predetermined level. It may not be necessary to withdraw any portion of the liquid from the pressure line 33 beyond pump 64 inasmuch as I provide an overflow pipe 68 which opens from a point above baffle 60 through the bottom of collecting pan 37 into an annular receiving channel 69 from which pipe 70 leads to any suitable drain. Any floating foreign matter will tend to escape through the overflow pipe 68 and assuming that the make up pipe 55 supplies an amount of liquid in excess of actual requirements, there will constantly be drainage through overflow pipe 68, which will thereby maintain a predetermined level of liquid within pan 37, at the same time carrying off excess impurities.

In some instances it may be desirable to insert a toothed roller in advance of the blade 40 as shown in Figs. 12 and 13. The radial arm 39 which carries the blade is provided with forwardly projecting bearing supports at 71 in which is journaled a shaft 72 carrying roller 73. This roller has radially projecting blades 74 desirably in staggered series as shown in Fig. 13. These blades engage the layer of ice 45, forcing their way partly through the layer, without contacting the surface of wall 15. The engagement of the blades with the ice not only facilitates the breaking of the ice into chips as above described but also causes the roller to rotate. Its rotation precludes any clogging within housing 50 of the chips which are dislodged by blade 40. During roller rotation, the blades engage any chips which are lodged within the housing and cause them to fall downwardly therethrough.

The description of the freezer apparatus per se is now complete. From a method standpoint, I may summarize its operation.

Minutely atomized, and previously chilled, liquid is delivered at high impact velocity against a chilled surface for instant freezing of its water content upon such surface. The ice thus deposited is broken off in a continuous operation which plows chunks of such ice bodily free from the refrigerated surface to leave abrupt shoulders. The ice is desirably washed immediately in advance of the point at which chunks are thus dislodged and the liquid used for washing is thereby chilled and a major portion thereof is re-circulated and atomized as above described. The high impact velocity of the spray, and the subsequent washing operation, assure that the chunks which are dislodged from the refrigerated wall are crystal clear and substantially free of impurities. The whole procedure is conducted as a continuous operation.

Where desired, the freezer as above described may be located within a bin 75 having a refrigerating jacket for maintaining ice chunks therein super-cooled to several degrees below their freezing point. The freezer in its entirety is shown in Fig. 10 at 220. It may be identical with that above described except that it is supported from the top wall 76 of the bin and its tubular shaft is extended at 250 through a sleeve shaft 77 which extends axially through bin 75. The connection 620 from the lower end of tubular shaft 250 leads to pump 64 from a point below the bin and the pressure line 330 from the pump 64 to the freezer is located outside the bin.

Within the bin, the sleeve shaft 77 carries agitating arms 78 and 79 respectively located near the top and bottom of the bin. These arms are desirably flat on their undersurfaces and tapered from their center lines to their leading and trailing edges. Each arm is desirably extended in a volute direction from the sleeve shaft 77 to the periphery of the bin, the apex of each arm being forwardly directed as shown at 80 in Fig. 11.

The sleeve shaft 77 need not operate continuously. It may be provided with a clutch 81 at its lower end. A complementary clutch 82 splined to the lower end of shaft 250 may be moved by hand lever 83 to and from engagement with clutch 81 so that sleeve shaft 77 may be driven when desired.

A discharge about 85 leads from the bottom of bin 75 and is controlled by a manually operable gate at 86 so that the ice chips stored in the bin may be delivered therefrom as needed. Super-cooled ice chips will not adhere to each other and will tend to flow like sand from the bin. However, if there is any adhesion, the slowly rotating blades 79 will break it up and deliver the chips across the spout 85 for discharge therefrom. The flat shaped form of the blades enables them to move beneath the mass of ice in the bin for this purpose and without requiring excessive energy.

In the supporting housing 88 below the bin I may provide a motor driven refrigerated compressor 89 for refrigerating the bin and the jacket of the freezer.

I claim:

1. A method of ice chip manufacture which comprises spraying a super cooled refrigerated surface with a finely atomized chilled liquid to form increments of ice, flowing unatomized liquid at a temperature too high for freezing over the ice so formed to wash the ice free of impurities, at the same time chilling the unatomized liquid by its traverse of the ice, discharging a portion of the unatomized liquid sufficient to maintain at a low level the concentration of impurities therein, and taking the liquid to be atomized as aforesaid from a remaining portion of such unatomized liquid after said remaining portion has been reduced to temperatures close to its freezing point.

2. A method of ice manufacture which comprises the deposit on a supercooled surface of a liquid to be frozen, such liquid being close to its freezing point at the time of deposit, flowing over the deposited ice on said surface a quantity of liquid to be frozen which is at a materially higher temperature, said last mentioned quantity of liquid being used to wash the ice and to be cooled for subsequent deposit, the operation of washing the ice and depositing the cooled liquid on such surface to be frozen into fresh ice being conducted as a substantially continuous operation, including the removal from such surface of the deposited and washed ice.

3. The method recited in claim 2 in which the liquid cooled in the washing of ice made from previously deposited liquid is finely atomized and delivered at high impact velocity onto the ice made from previously deposited liquid whereby such ice will be clear.

4. The method recited in claim 2 in which the removal of ice from said surface is effected substantially continuously and includes the bodily cracking from said surface of pieces of ice which are substantially equal in thickness to the entire deposit of ice on said surface.

5. A method of ice manufacture which comprises spraying onto a supercooled surface and onto ice previously frozen on such surface minute particles of chilled liquid to be frozen, shielding portions of the ice on said surface from said spray, separately flowing liquid across the ice on the shielded portion of said surface for the washing of such ice and the cooling of the separately flowed washing liquid, and thereafter returning for atomization at least a portion of the chilled liquid used for washing.

6. The method recited in claim 5 in which the atomized particles of chilled liquid are impelled with high impact velocity against such surface and ice previously formed thereon, whereby to freeze clear.

7. A device of the character described comprising a refrigerated wall of circular cross section, a blade having a rotatable mounting supported for rotation concentric with said wall, the blade conforming to said wall and being adapted to remove from said wall ice deposited thereon, baffle means carried by said mounting and projecting outwardly therefrom toward the wall, and a liquid pressure spray connection having a discharge orifice of substantial cross section and opening in a direction generally parallel to the axis of rotation of said mounting, said baffle means being rotatable with said mounting across the path of liquid issuing under pressure from said orifice for impact at high velocity against said rotating baffles, whereby to atomize such liquid, resulting atomized particles of such liquid impinging on said wall.

8. The device of claim 7 in which said baffle means comprises a helical series of generally radial pegs of such width as to provide at all times at least one peg in the path of such liquid.

9. In an ice making machine the combination with a rotor, of a concentric refrigerated wall, means for delivering liquid to the wall to be frozen thereon and a blade carried by the rotor and comprising plow teeth for breaking rather than scraping pieces of ice from said wall, said blade comprising a generally radial support from which said blade extends substantially tangentially along the surface of the wall, said blade having a series of tangentially projecting teeth having points with back faces substantially engaging the wall, said blade further having intervening channels between said points.

10. In combination with a refrigerated wall, an ice plow blade for breaking and dislodging whole chunks of ice from a deposit on said wall, said blade comprising an edge portion having spaced pointed teeth projecting therefrom, said blade having channels between successive teeth at said edge and said teeth having back surfaces in face contact with a surface of said wall along which the points of said teeth extend.

11. An ice making machine comprising the combination with a rotor, of a concentric refrigerated wall, a generally radial support carried by the rotor, a blade having an ice removing edge conforming to the wall and disposed substantially tangentially thereto, said blade being mounted on said support to traverse said wall during rotor movement, a wall protecting housing carried by the support and within which the blade is disposed, and means for projecting and atomizing liquid to be frozen against wall surfaces other than those protected by said housing.

12. The device of claim 11 including means within said housing including a discharge port for flowing relatively warm liquid over the surface of ice formed on said wall in advance of the path of movement of said blade to wash such ice, a collecting pan for recovering such liquid after it has traversed the ice and has been cooled thereby, and means for pumping the cooled liquid to said projecting and atomizing means to be projected upon said wall and upon ice frozen to said wall.

13. In an ice making machine for freezing deposited liquid on a refrigerated wall, the combination with a shield extending along said wall and provided with a mounting upon which it is movable across said wall in immediate proximity thereto, and a wash pipe extending from said mounting and having a discharge opening between the shield and the wall for the discharge of a washing fluid against ice deposited on said wall and within the confines of said shield.

14. The combination with the device of claim 13, of an ice dislodging blade having a working edge projecting along said wall, said blade being provided with means supporting it from said shield mounting for movement with the shield across said wall to engage and dislodge ice washed by the effluent from said pipe.

15. In an ice making machine of the type comprising a refrigerated wall and means for spraying thereon liquid to be frozen on said wall, the combination with a movable mounting, of a hood provided with means supporting it from the mounting for movement along said wall, said hood having substantial extent across said wall in a direction transverse to its direction of movement, an ice dislodging blade supported by said means within said hood and in immediate proximity to said wall with its edge projecting forwardly in the direction of movement of said hood, a wash-liquid supply pipe extending from said mounting through said hood and provided with a discharge orifice adjacent a forward margin of the hood, whereby liquid issuing from said discharge opening will flow over previously formed ice while such ice is protected by said hood from the spray.

16. The device of claim 15 in which said hood is provided at its forward edge with a forwardly projecting flange in immediate proximity to the ice deposit on the wall and through which the discharge orifice of said pipe extends, the hood deviating concavely from the wall behind said flange and the blade being disposed within the concave portion of the hood.

17. The combination with a refrigerated wall of circular cross section, of a tubular shaft provided with bearings coaxial with the wall, means for rotating the shaft, an ice dislodging blade in immediate proximity to the wall, means for supporting the blade from the shaft, means for washing ice deposited on said wall immediately in advance of said blade, said washing means comprising a liquid conduit extending outwardly from the shaft, and means for supplying wash liquid to said conduit through the tubular shaft, said conduit having a discharge opening directed toward said wall and disposed close to the wall and closely in advance of said blade, in further combination with a hood supported from said shaft for rotation with the blade, said hood enclosing the blade and having an opening through which said conduit discharges wash liquid upon ice shielded by said hood.

18. In an ice making machine, the combination with a rotatable shaft and a generally concentric refrigerated wall, of a receptacle mounted on said shaft and enclosing the bottom of said wall, liquid atomizing means for discharging liquid upon said wall to be frozen thereon, separate means for flowing washing liquid over the ice frozen against said wall, said receptacle catching all surplus of the liquid so discharged and so flowed, a pump having an inlet in operative connection with said receptacle to withdraw liquid therefrom and having its outlet connected with said liquid atomizing means whereby the atomized liquid discharged upon said wall to be frozen thereon is liquid pre-cooled by previous contact with said wall.

19. The device of claim 18 in further combination with a blade connected with said shaft and having a working edge disposed in immediate proximity to the wall and directed circumferentially thereof, the blade extending along the wall in the direction of the axis of said shaft whereby said blade will dislodge ice frozen against said wall, said receptacle being rotatably mounted and connected with the shaft and provided immediately below said blade with a discharge chute opening laterally from the receptacle for the discharge therefrom of ice dislodged from said wall by said blade.

20. The device of claim 19 in further combination with a hood mounted on said shaft to turn with said blade and enveloping the blade for confining the ice dislodged thereby, said hood extending along said blade toward said chute for guiding dislodged ice toward said chute for discharge.

21. The device of claim 19 in which said chute comprises a foraminous screen for supporting ice while permitting water to pass through the screen into said receptacle.

22. The device of claim 19 in which said blade has its leading edge provided with spaced channels and intervening teeth pointed in the direction of blade advance and toward the surface of said wall, the outer sides of said teeth comprising faces in substantial contact with said wall whereby to dislodge ice by breaking it bodily from said wall, thereby leaving the broken edge generally radial respecting said wall beneath which said teeth may engage in their continued advance peripherally of the wall.

23. The device of claim 19 in further combination with an annular chamber surrounding said shaft and provided with axially directed ports, said shaft being provided with baffle spokes in helical series affording impact surfaces substantially continuous from one tooth to another in the path of streams of liquid issuing from said ports, and means for supplying liquid under pressure to said chamber to issue from said ports in streams having velocity high enough to be atomized upon contact with said baffle spokes, the atomized particles being deflected at high velocity against said wall.

24. An ice making machine comprising the combination with a pipe for supplying liquid to be frozen, of a tubular shaft into which said pipe discharges, a generally cylindrical wall encircling the shaft and provided with a refrigerating jacket, and means for circulating supercooled refrigerant therethrough, a partition in the tubular shaft at approximately the level of the top of said wall, a helical series of radial spoke baffles projecting from said shaft almost throughout the height of said wall, an annular chamber surrounding the shaft and having axially directed ports for projecting streams of liquid against said baffles to be atomized thereby for the reflection of atomized particles of liquid at high velocity upon said wall, a blade having plow teeth substantially in contact with the wall, said blade extending axially of the wall and being provided with means supporting it from the shaft, a wash-liquid duct leading from the interior of the tubular shaft above the partition to a point immediately adjacent the wall and immediately in advance of the blade and having a discharge opening directed against the wall for flowing wash liquid over ice deposited on the wall in advance of the blade, a receptacle below the wall for collecting surplus wash liquid cooled by its traverse of such ice, means for diverting from said collecting means the ice dislodged by said blade, and a pump having an inlet connected with the receptacle and having an outlet connected with said annular chamber for delivering under pressure to said chamber the surplus wash liquid and unused atomized liquid cooled by said ice to be projected in streams against said baffles and atomized thereby for delivery toward said wall as aforesaid.

25. The combination with a continuous ice freezing device and means for continuously dislodging and discharging chunks of ice frozen therein, said ice freezing device comprising a supercooled jacket whereby the ice chunks discharged therefrom is supercooled, of a supercooled storage bin arranged to receive the ice chunks continuously discharged from said freezer and provided with a discharge chute for the gravity delivery of supercharged chunks of ice, the said freezer comprises a shaft extending axially of the bin and the bin comprises agitating means disposed concentrically with the shaft, said agitating means and shaft having mutually engageable clutch members, and a clutch control device for effecting such engagement and disengagement of said members.

26. In a combination freezer and storage bin, an annular freezing wall provided with a jacket, and means for circulating supercooled refrigerant through said jacket, a shaft extending axially of said wall and disposed substantially upright, said shaft having a tubular portion extending materially below the wall, a refrigerated storage bin to which said tubular shaft portion extends centrally below said wall, means for projecting atomized liquid toward said wall to be frozen thereon and supercooled thereby, means connected with said shaft and including a blade in substantial engagement with the wall and adapted to dislodge particles of supercooled ice therefrom, a collecting pan below the wall having a connection into the tubular shaft, a supply conduit for icewashing liquid terminating in immediate proximity to said wall and immediately forwardly of said blade, said conduit having a portion connected with said shaft to rotate therewith, a surplus of such liquid being collected in said pan, a deflector beneath said blade for discharging radially above said pan ice dislodged from said wall by said blade, said deflector being connected with said shaft for rotation with the shaft and blade, a bin surrounding the path of movement of the deflector and extended therebeneath to receive the supercooled ice particles dislodged by the blade and discharged by the deflector, a connection to the tubular pipe below the bin, a pump having an inlet to which said connection leads and having an outlet leading to said liquid spraying means, a discharge chute leading from the bin, a sleeve shaft within the bin coaxial with the tubular shaft and extending through the bottom of the bin, and clutch means including clutch elements respectively connected with the tubular shaft of the sleeve shaft and disposed below the bin, one of said elements being provided with a shifting handle for engagement and disengagement of said element, said sleeve shaft being provided with agitating arms within the bin for dislodging ice therein for delivery to said chute.

27. The combination with a bin for super-cooled ice fragments and means for maintaining such fragments at temperatures well below their freezing point, said bin having a chute for gravity delivery of ice fragments, a gate controlling flow through said chute, an agitator within the bin for freeing such fragments, and means for actuating said agitator, the agitator being mounted for rotation across the bottom of the bin, said agitator comprising at least one arm extending outwardly to move across said chute, said chute opening from said bin at a point remote from the axis of agitator rotation.

References Cited in the file of this patent

UNITED STATES PATENTS

| Number | Name | Date |
|---|---|---|
| Re. 13,000 | Holden | July 27, 1909 |
| Re. 23,247 | Rigby | July 11, 1950 |
| 143,446 | Fitch | Oct. 7, 1873 |
| 490,475 | Holden | Jan. 24, 1893 |
| 828,888 | Hoofnagle | Aug. 21, 1906 |
| 1,020,759 | Holden | Mar. 19, 1912 |
| 1,271,879 | Felt | July 9, 1918 |
| 1,333,094 | Reed | Mar. 9, 1920 |
| 1,931,347 | Gay | Oct. 17, 1933 |
| 2,080,639 | Taylor | May 18, 1937 |
| 2,212,405 | Rose | Aug. 20, 1940 |
| 2,304,579 | Lindsey | Dec. 8, 1942 |
| 2,310,468 | Short | Feb. 9, 1943 |
| 2,431,278 | Raver | Nov. 18, 1947 |
| 2,542,892 | Bayston | Feb. 20, 1951 |
| 2,549,215 | Mansted | Apr. 17, 1951 |
| 2,575,374 | Walsh | Nov. 20, 1951 |
| 2,633,004 | Leeson | Mar. 31, 1953 |
| 2,648,203 | Heuser | Aug. 11, 1953 |
| 2,657,547 | Heuser | Nov. 3, 1953 |
| 2,665,852 | Shiveley | Jan. 12, 1954 |
| 2,674,858 | Magnuson | Apr. 13, 1954 |
| 2,683,357 | Albright | July 13, 1954 |
| 2,691,277 | Stair | Oct. 12, 1954 |